J. MAEBY.

Flood Gate.

No. 56,962.

Patented Aug. 7, 1866.

Witnesses.
P. J. Dodge
Geo Burgess

Inventor:
J. Maeby
By M. Dodge
Agent.

UNITED STATES PATENT OFFICE.

JEREMIAH MAEBY, OF PORTAGE, WISCONSIN.

IMPROVEMENT IN FLOOD-GATES.

Specification forming part of Letters Patent No. 56,962, dated August 7, 1866.

*To all whom it may concern:*

Be it known that I, JEREMIAH MAEBY, of Portage, in the county of Columbia and State of Wisconsin, have invented certain new and useful Improvements in Flood-Gates; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in so arranging one or more pivoted gates in a dam in such a manner that when the water in the dam rises above a certain height, as in case of floods, the pressure of the water will open the gate, and thus allow the water to escape, and when the water recedes the gate will close again automatically.

Figure 1:
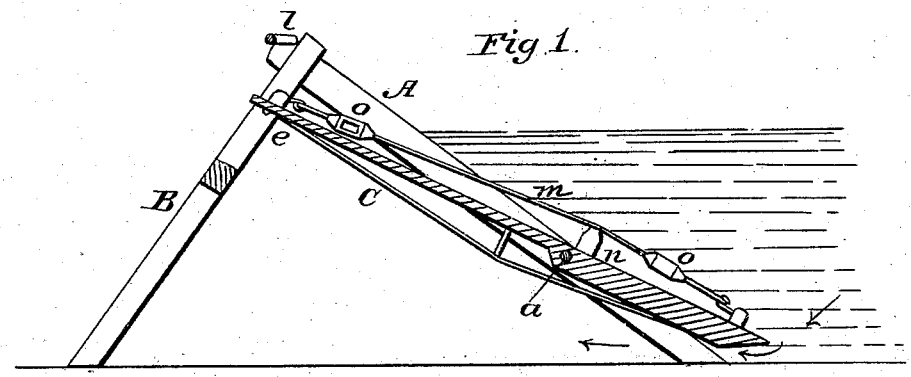
Figure 2:
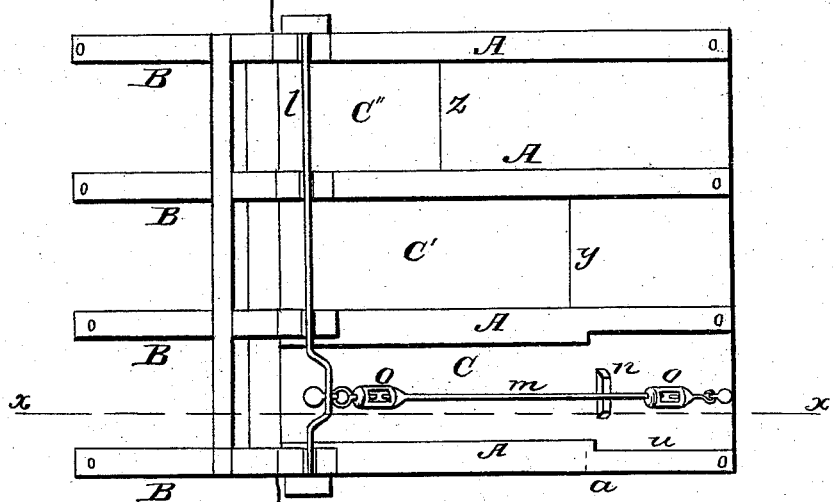

Figure 1 is a vertical section taken on the line of $x\,x$, Fig. 2. Fig. 2 is a top-plan view of the same.

A represents a series of timbers, forming a portion of the face of the dam, and held in position by the frame-work B or any other suitable supports. Between the timbers A a gate, C, is pivoted, as shown at $a$ of Fig. 1, the pivot being located below the center of the gate C, by which its upper end or arm is rendered longer than its lower. At the same time its lower arm is made heavier than its upper, so that it will close by its own gravity when released from an excess of pressure on its upper arm. This gate C is made of any suitable material, and, if desired, it may be strengthened by the truss-rod $m$, secured at its extremities, and passing over a bridge, $n$, as shown clearly in Fig. 1, the rod being also provided with swivel-nuts for tightening it up, as desired. A similar rod may also be secured to its under side to keep it straight and prevent it from warping, if made of wood, so that it will shut down tight and close when closed.

The gate C will be provided with suitable flanges, as shown at $u$, Fig. 2, to shut over the edge of the timbers A, the latter being provided with similar projections to shut over the upper arm of the gate when closed; or there may be recesses cut for the flanges in the timbers A, to render the dam tight and afford a support for the gate C when closed.

In Fig. 1 the gate C is represented as extending entirely to the bottom of the dam; but it is obvious that any number of the gates may be used, and that they may be of any desired length. In Fig. 2 a series of three is represented, the first gate, C, extending to bottom, as in Fig. 1, while C' only reaches to $y$, and C'' stops at $z$, they being pivoted alike in all cases.

It will thus be seen that when the water in the dam rises above the pivot-point of any gate far enough to overbalance the pressure upon the arm below that point it will cause the gate to tip, as shown in Fig. 1, thereby opening it at its lower end, and permitting the water to escape, as indicated by the arrows. As soon, however, as the water recedes, so that the pressure on the upper arm is less than on the lower arm, the gate will automatically close again.

By having a series of gates of varying lengths arranged as shown in Fig. 2, it will be seen that as the water increases rapidly, as in case of a flood, and rises suddenly in the dam, the higher it gets the more gates there are opened to permit its escape.

A rod or other support, as shown at $e$, Fig. 1, should be provided to arrest the descent of the upper arm of the gate and prevent it from tipping too far.

If desired, a bent rod, $l$, or any equivalent device, may be used for adjusting and holding the gates open when the water is not sufficiently high to open it by its pressure.

Having thus described my invention, what I claim is—

The tilting gate C, pivoted so that the pressure of the water thereon shall cause it to open and close in the manner substantially as herein shown and described.

JEREMIAH MAEBY.

Witnesses:
 O. P. WILLIAMS,
 H. C. BAKER.